B. B. SCOFIELD
Wagon-Brake.
No. 63,312. Patented Mar. 26, 1867.
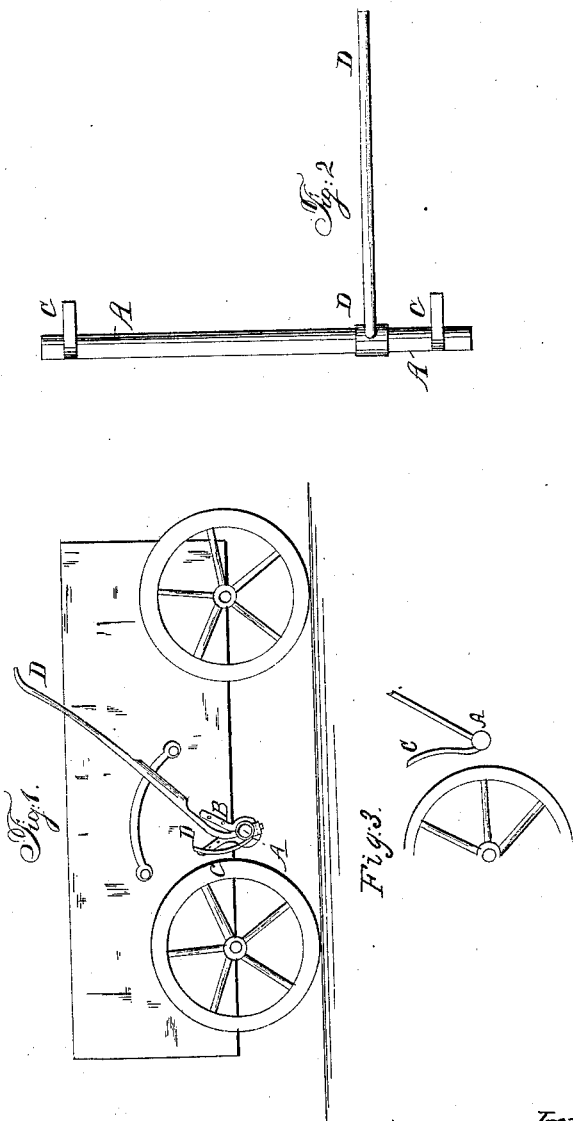

United States Patent Office.

B. B. SCOFIELD, OF WOODHULL, ILLINOIS.

Letters Patent No. 63,312, dated March 26, 1867.

IMPROVEMENT IN WAGON BRAKE.

*The Schedule referred to in these Letters Patent and making part of the same.*

TO ALL WHOM IT MAY CONCERN:

Be it known that I, B. B. SCOFIELD, of Woodhull, in the county of Henry, and State of Illinois, have invented a new and improved Wagon Brake; and I do hereby declare that the following is a full, clear, and exact description thereof, which will enable others skilled in the art to make and use the same, reference being had to the accompanying drawings, forming part of this specification, in which—

Figure 1 is a side view of my improved brake, showing in red lines a wagon to which it is attached.

Figure 2 is a detail view of the same.

Figure 3 is a detail view, showing another form for the shoes.

Similar letters of reference indicate like parts.

My invention has for its object to furnish an improved brake for wagons, carriages, &c., simple in construction, and effective in operation; and it consists in an improved brake formed by the combination of a revolving cylinder, curved shoes or rubbers and lever with each other, as hereinafter more fully described.

A is the cylinder, which revolves in ears or bearings, B, attached to the body or hounds of the wagon, in such a position that it may be just in front of the wheels to which it is desired that the brake should be applied. C are the shoes or rubbers, which are attached to the cylinder in such positions as to be directly in front of the faces of the wheels. The shoes C may be made cam-shaped, as shown in fig. 1, and they are applied to the wheels by revolving the cylinder A in the opposite direction from that in which the wheels are revolving. This causes the wheels and rubbers to be drawn by the friction closer and closer together, until the movement of the wheel is stopped. Or the shoes C may be made in the form shown in fig. 3, that is to say, the lower or convex part should be the arc of a circle, the radius of which is about five and three-quarter inches, and the upper or concave part should correspond with the curve of the rim of the wheel to which the brake is to be applied; and the cylinder A should be so attached to the wagon that when revolved the upper part of the lower or convex part of the shoe may first come in contact with the wheel. The effect of the friction will be to force the wheel into the concave of the shoe, causing the shoe to hug the face of the wheel, and thus more effectually stopping the movement of the wheel. This latter construction of the shoes I prefer. The cylinder A is revolved to operate the brake by means of the lever D, the lower end of which is securely attached to the cylinder A, and extends up in a direction at right angles to the direction of said cylinder, into such a position as to be readily reached and operated by the driver. The lever D may be held in any position in which it may be placed by a rack attached to the wagon body in the ordinary manner. By means of the lever D the brake may be so operated that the rubbers or shoes C may apply any desired amount of friction to the wheels, from the slightest touch to such an amount as will entirely stop the revolution of the wheels.

I claim as new, and desire to secure by Letters Patent—

An improved brake formed by the combination of the revolving cylinder A, curved shoes C, and lever D, with each other, substantially as herein shown and described, and for the purpose set forth.

B. B. SCOFIELD.

Witnesses:
 H. P. SCOFIELD,
 WM. E. BARKER.